United States Patent
Achatz et al.

(10) Patent No.: US 12,153,125 B2
(45) Date of Patent: Nov. 26, 2024

(54) RADAR SYSTEM AND METHOD FOR PERFORMING DIRECTION OF ARRIVAL ESTIMATION IN A RADAR SYSTEM

(71) Applicant: Infineon Technologies AG, Neubiberg (DE)

(72) Inventors: Simon Achatz, Munich (DE); Maximilian Eschbaumer, Munich (DE)

(73) Assignee: Infineon Technologies AG, Neubiberg (DE)

(*) Notice: Subject to any disclaimer, the term of this patent is extended or adjusted under 35 U.S.C. 154(b) by 395 days.

(21) Appl. No.: 17/730,218

(22) Filed: Apr. 27, 2022

(65) Prior Publication Data
US 2023/0350054 A1 Nov. 2, 2023

(51) Int. Cl.
*G01S 13/89* (2006.01)
*G01S 13/42* (2006.01)
*G01S 13/58* (2006.01)
*G01S 13/931* (2020.01)
*G06N 3/08* (2023.01)

(52) U.S. Cl.
CPC .............. *G01S 13/89* (2013.01); *G01S 13/42* (2013.01); *G01S 13/58* (2013.01); *G01S 13/931* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 11,790,492 B1* | 10/2023 | Ahmad | G06N 3/0495 |
| 2016/0097853 A1* | 4/2016 | Kamo | H01Q 1/32 |
| | | | 342/70 |
| 2017/0293025 A1* | 10/2017 | Davis | G01S 7/0233 |

* cited by examiner

*Primary Examiner* — Vladimir Magloire
*Assistant Examiner* — David C. Schultz
(74) *Attorney, Agent, or Firm* — VIERING, JENTSCHURA & PARTNER MBB

(57) ABSTRACT

According to various embodiments, a radar system is described including a direction of arrival pre-processor configured to, for a detected peak, obtain a Doppler Fourier transform result vector, generate a spatial covariance matrix for the Doppler Fourier transform result vector, and generate an additional spatial covariance matrix by inputting the spatial covariance matrix to a machine learning model trained to predict, from an input spatial covariance matrix, an output spatial covariance matrix such that the output spatial covariance matrix corresponds to a different chirp center frequency than the input covariance spatial covariance matrix and including a direction of arrival estimator configured to perform direction-of-arrival estimation using the additional spatial covariance matrix.

18 Claims, 9 Drawing Sheets

FIG 1
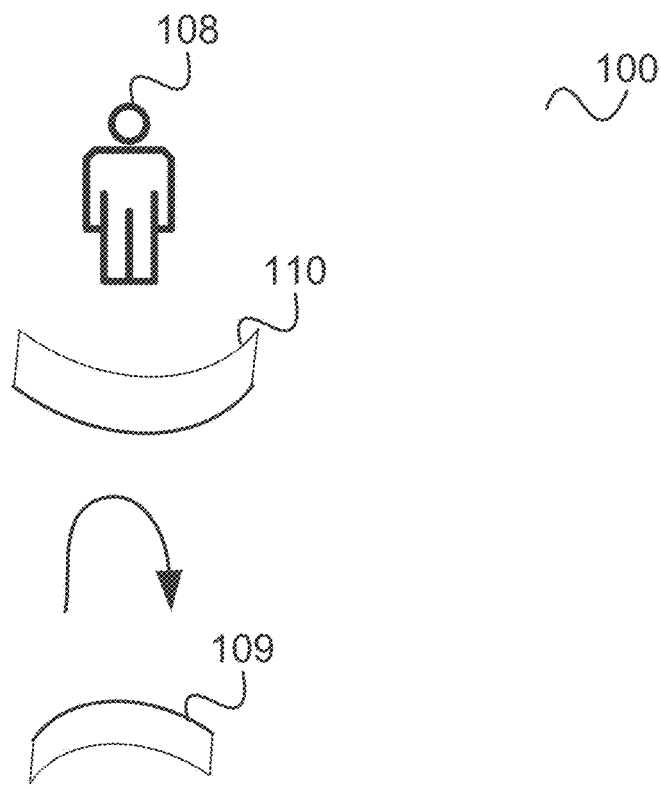
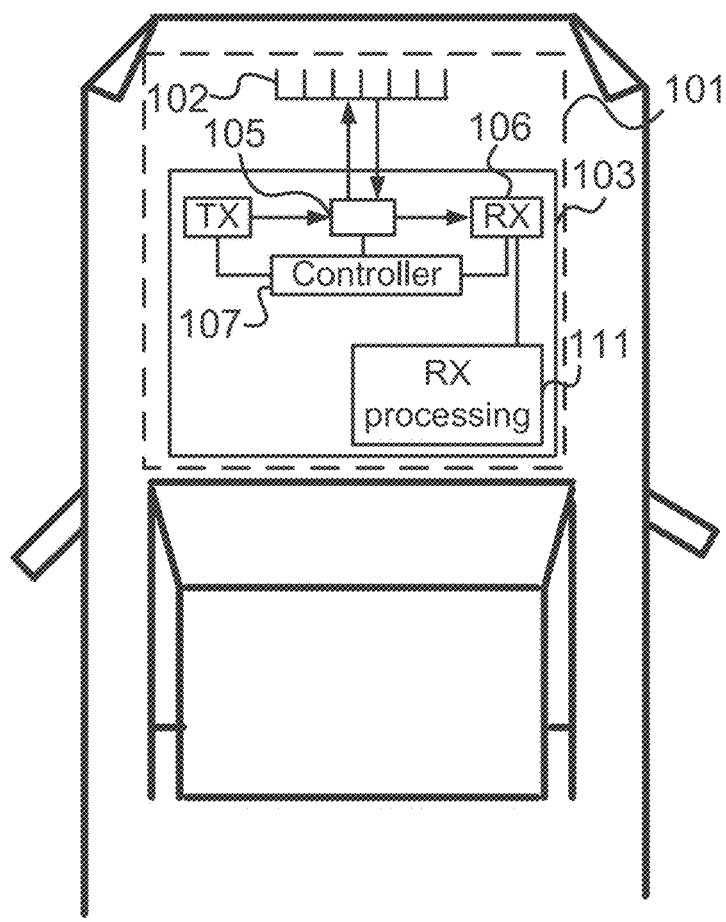

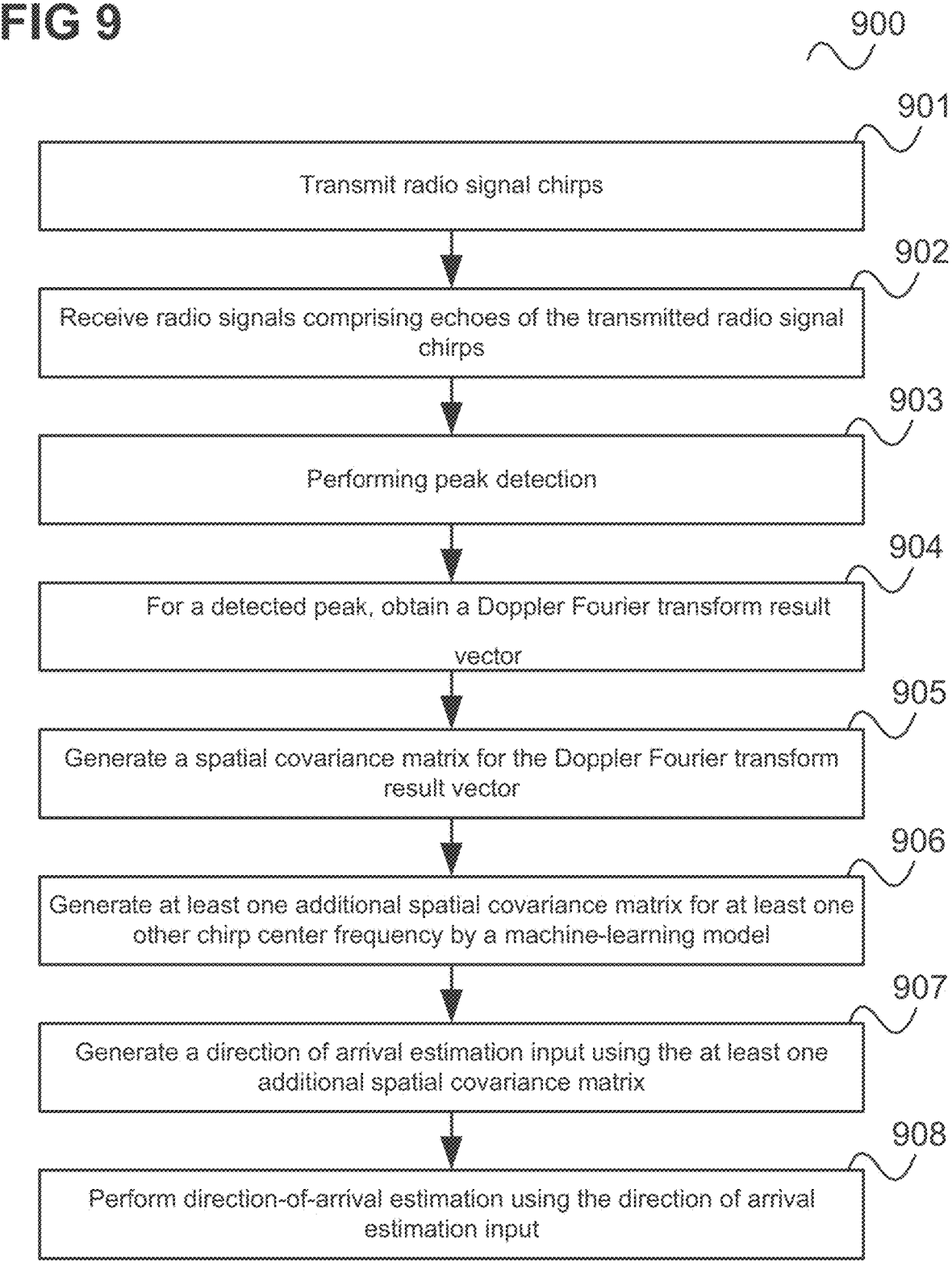

RADAR SYSTEM AND METHOD FOR PERFORMING DIRECTION OF ARRIVAL ESTIMATION IN A RADAR SYSTEM

TECHNICAL FIELD

Exemplary implementations described herein generally relate to radar systems and methods for performing direction of arrival estimation in a radar system.

BACKGROUND

A radar system which receives radar signals via a plurality of receive antennas or channels (which may also be virtual channels formed by pairs of transmit antenna and receive antenna) allows the direction of arrival (DoA) determination of a detected object from the radar signals which have been received via the channels by deriving corresponding range-Doppler-map data for the DoA determination from the received signals. The higher the number of channels is for which radar signals are received and range-Doppler-map data for the DoA is generated, the more accurate the DoA is and the better it can resolve two nearby targets. It is possible to calculate range-Doppler-map data for DoA for additional (not physically existing) channels and thus making it unnecessary to actually provide pairs of transmit and receive antennas for these additionally channels. However, extending range-Doppler-map data for the DoA in this manner leads to entries for different channels being strongly correlated, thus reducing performance of the DoA determination. Even if range-Doppler-map data for the DoA is not generated for additional channels, there may be correlation between the channels.

Therefore, approaches are desirable that allow achieving a high DoA performance in a radar system with correlation of range-Doppler-map data between different channels.

SUMMARY

According to various embodiments, a radar system is provided including a radar transmitter configured to transmit radio signal chirps with a predetermined center frequency via at least one transmit antenna, a radar receiver configured to receive radio signals including echoes of the transmitted radio signal chirps, a peak detector configured to perform peak detection using the received radio signals, wherein each detected peak corresponds to a detected object, a direction of arrival pre-processor configured to
  for a detected peak, obtain a Doppler Fourier transform result vector having, for each of the channels, an entry specifying a Doppler Fourier transform result for the channel;
  generate a spatial covariance matrix for the Doppler Fourier transform result vector; and
  generate, for each center frequency of a set of at least one other center frequencies, an additional spatial covariance matrix by inputting the spatial covariance matrix to a machine learning model trained to predict, from an input spatial covariance matrix an output spatial covariance matrix such that the output spatial covariance matrix corresponds to a different chirp center frequency than the input covariance spatial covariance matrix; and
a direction of arrival estimator, wherein the direction of arrival pre-processor is configured to generate a direction of arrival estimation input using the at least one additional spatial covariance matrix and the direction of arrival estimator is configured to perform direction-of-arrival estimation using the direction of arrival estimation input.

According to a further embodiment, a method for performing direction of arrival estimation in a radar system according to the above radar system is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 1 shows a radar arrangement.

FIG. 9 shows a flow diagram illustrating a method for performing direction of arrival estimation in a radar system according to an embodiment.

DESCRIPTION OF EXEMPLARY IMPLEMENTATIONS

Figure 2:
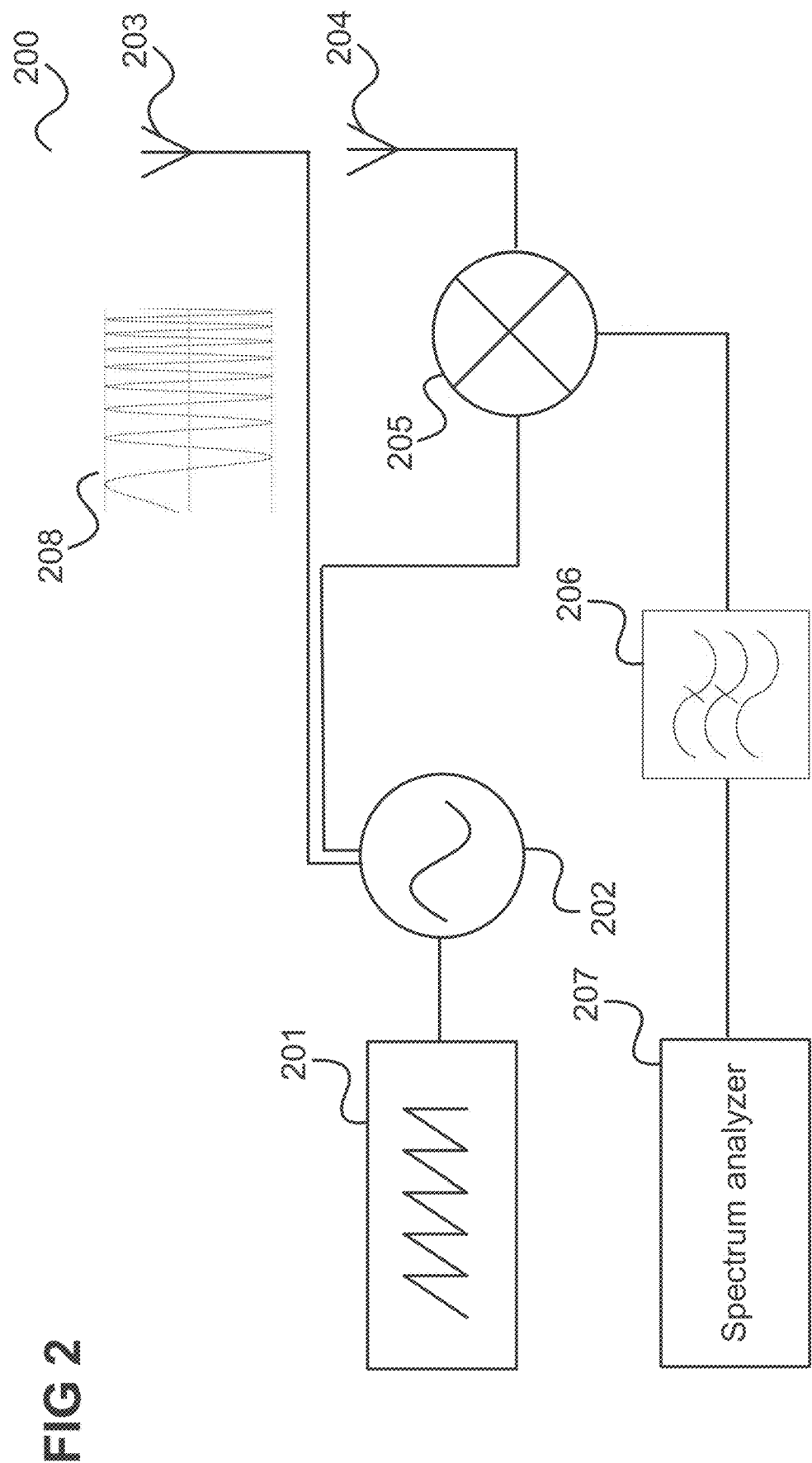
FIG. 2 illustrates an FMCW (Frequency Modulated Continuous Wave) radar system.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

FIG. 1 shows a radar arrangement 100.

The radar arrangement 100 includes a radar device (implementing a radar system) 101 that includes an antenna arrangement 102 and a radar control device 103. It should be noted that, while the radar system is in this example implemented by a radar device 101, the radar system may be also implemented by an arrangement of devices, e.g. including an electronic control unit (ECU) or a vehicle controller and/or a device (or arrangement) implementing an Advanced Driver Assistance Systems (ADAS).

The radar control device 103 includes one or more (radar) transmitters 104, a duplexer 105 (i.e. a circuit to separate transmitted signals from received signals), a (radar) receiver 106 and a controller 107. The radar arrangement may include multiple transmit antennas in form of a transmit antenna array and multiple receive antennas in form of a receive antenna array.

For the detection of an object 108, the controller 107 controls the one or more transmitters 104, the duplexer 105 and the receiver 106 as follows:

1. The one or more transmitters 104 transmit a transmit signal 109 via the antenna arrangement 102.

2. The transmit signal 109 is reflected by a target (object) 108;
3. The radar device 101 receives the echo 110 of the transmitted signal as receive signal.

From the received signal, the radar control device 103 (e.g. a radar signal processing circuit 111) calculates information about position and speed of the object 108.

For example, the radar device 101 may be installed in a vehicle for detection of nearby objects, in particular for autonomous driving.

The transmit signal 109 may include a plurality of pulses. Pulse transmission includes the transmission of short high-power bursts in combination with times during which the radar device 101 listens for echoes 110. This is typically not optimal for a highly dynamic situation like in an automotive scenario.

Therefore, a continuous wave (CW) may instead be used as transmit signal. Since a continuous wave only allows velocity determination, but does not provide range information (due to the lack of a time mark that could allow distance calculation) an approach is frequency-modulated continuous wave (FMCW) radar or phase-modulated continuous wave (PMCW) radar.

FIG. 2 illustrates an FMCW radar system 200.

In an FMCW radar system, rather than sending a transmit signal with a constant frequency, the frequency of the transmit signal is periodically ramped up and reset according to a saw tooth (or alternatively a triangle) waveform 201. The saw tooth waveform 201 may for example be generated by a ramping circuit (or "ramper"). The saw tooth waveform 201 frequency-modulates an oscillator 202 and the resulting transmit signal is fed to a transmit antenna 203 (by means of a radio frequency (RF) frontend).

A receive antenna 204 receives the echo of the transmit signal (in addition to noise etc.) as receive signal. A mixer 205 mixes the transmit signal with the receive signal. The result of the mixing is filtered by a low pass filter 206 and processed by a spectrum analyzer 207.

The transmit signal has the form of a sequence of chirps (or "ramps"), which are result of the modulation of a sinusoid with the saw tooth waveform 201. One single chirp 208 corresponds to the sinusoid of the oscillator signal frequency-modulated by one "tooth" of the saw tooth waveform 201 from the minimum frequency to the maximum frequency.

As will be described in detail further below, the spectrum analyzer 207 (e.g. implemented by radar signal processing circuit 111) performs two FFT (Fast Fourier Transform) stages to extract range information (by a first stage FFT, also denoted as range FFT) as well as velocity information (by a second stage FFT, also denoted as Doppler FFT) from the receive signal. It should be noted that the spectrum analyzer 207 works on digital samples so an A/D (analog-to-digital) conversion is included in the path from the receive antenna 204 to the spectrum analyzer 207. For example, the filter 206 is an analog filter and an analog-to-digital converter (ADC) is arranged between the filter 206 and the spectrum analyzer 207. At least some of the various components of the receive path may accordingly be part of a digital or analog frontend.

To further allow determination of a direction of the object 108 with respect to the radar device 101, the antenna arrangement 101 may include a plurality of receive antennas, i.e. an array of receive antennas. The direction of an object 108 may then be determined from phase differences by which the receive antennas receive an echo from an object 110, for example by means of a third stage FFT (also denoted as angular FFT). Accordingly, a radar receiver may include a mixer 205, an analog filter 206 and an ADC for each receive antenna.

The signals received by a plurality of antennas may be processed by means of an MMIC (Monolithic Microwave Integrated Circuit).

Figure 3:
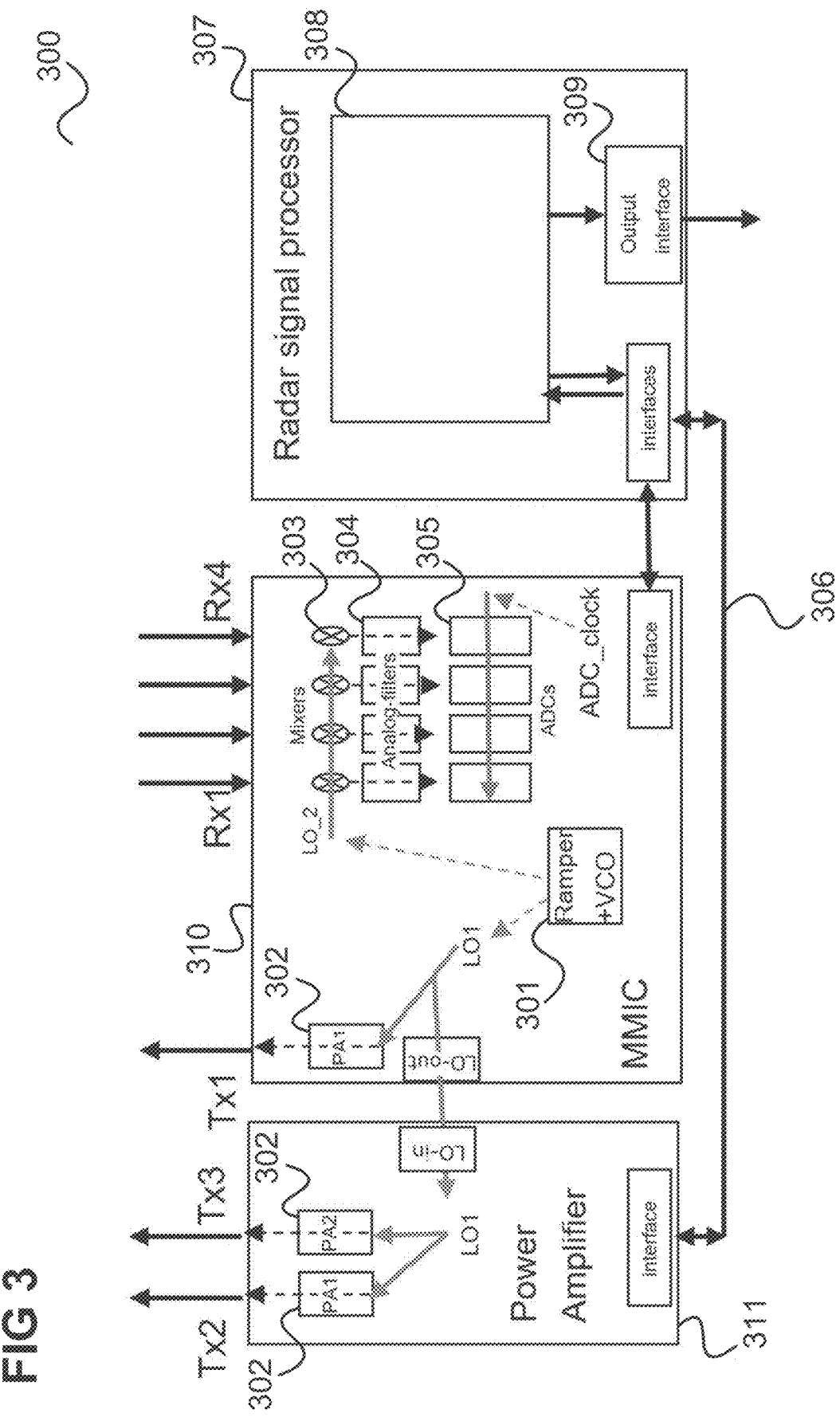
FIG. 3 shows a radar device having a plurality of transmit antennas and receive antennas.

FIG. 3 shows a radar device 300 having a plurality of transmit antennas and receive antennas.

The radar device 300 includes an MMIC 310 which includes a (voltage-controlled) oscillator with ramper 301 which supplies transmit amplifiers 302 (one for each transmit antenna) and mixers 303 with a transmit signal as described with reference to FIG. 2.

In the example of FIG. 3, two of the transmit amplifiers 302 are provided by a power amplifier 311 to which the transmit signal is provided via a transmit signal interface 312. However, the transmit amplifiers may also all be provided within the MMIC 310

There is one mixer 303 in the MMIC 310 for each receive antenna. Analog filters 304 (corresponding to filter 206) filter the mixed signals and analog-to-digital converters (ADCs) 305 generate digital signals from the filtered analog signals. The MMIC 310 transfers their output via a digital interface 306 to a radar signal processor 307.

The radar signal processor 307 has a radar signal processing circuit 308 (for example corresponding to the radar signal processing circuit 111), implements a spectrum analyzer and performs object detection and determination (i.e. estimation) of direction of arrival as explained in the following with reference to FIG. 4.

Figure 4:
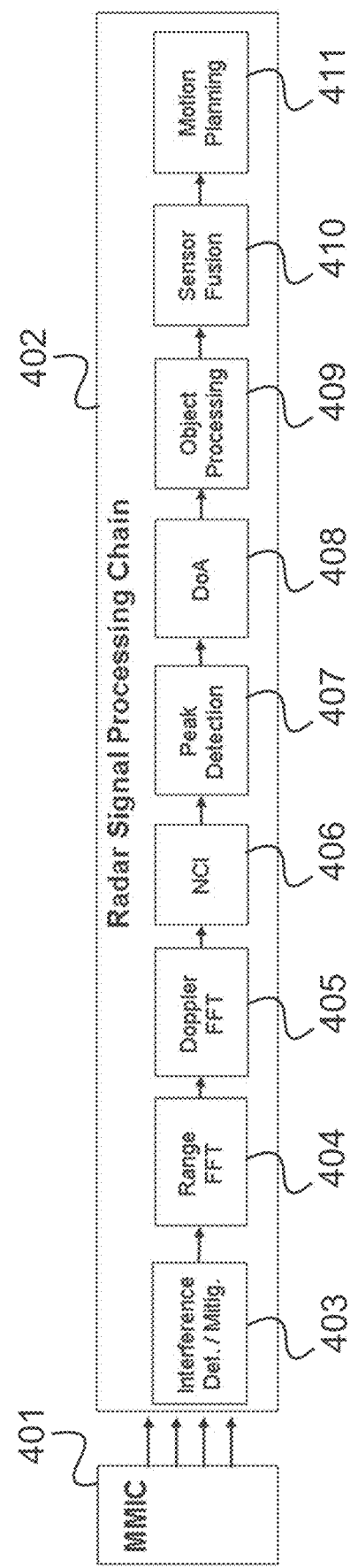
FIG. 4 illustrates the processing of radar signals.

FIG. 4 illustrates the processing of radar signals received using an MMIC 401.

The MMIC 401 is for example part of the receiver 106. The MMIC 401 is coupled with a plurality of antennas and is supplied with received signals from the respective plurality of antennas.

It should be noted that an MMIC has a given number of receive channels according to its (chip) design. Since thus, an MMIC can only serve a limited number of receive antennas, multiple MMICs may be used to allow using a higher number of receive antennas. In that case, there are multiple MMICs instead of the single MMIC 401 but the processing is similar.

The MMIC 401 performs processing of the received signals like amplification, frequency down conversion (i.e. for example the functionality of mixer 205 and filter 206) and A/D conversion. The MMICs may also implement the duplexer 105, i.e. may be configured to separate transmission signals from reception signals. The MMIC 401 supplies the resulting digitized receive signals to a radar signal processing chain 402 (e.g. implemented by radar signal processor 307).

The radar signal processing chain 402 performs interference detection and mitigation 403 on the digitized receive signals followed by a first FFT (Fast Fourier Transform) 404, also referred to as range FFT and a second FFT 405, also referred to as Doppler FFT. Based on the outputs of the FFTs 404, 405 the radar signal processing chain 402 determines range information as well as velocity information (e.g. in form of a R/D (range-Doppler) map) for one or more objects in 407.

It should be noted that the output of the second FFT 405 is a two-dimensional FFT result (wherein one dimension corresponds to range and the other to velocity) for each antenna (namely based on the processing of the samples of the receive signal received by this specific antenna). The result of the first FFT 404 includes, for each receive antenna, a complex value for a range bin.

The second FFT 405 goes over the result of the first FFT 404 over multiple chirps, for each range bin, generating, per range bin, a complex value for each Doppler bin. Thus, result of the second FFT stage 405 includes, for each receive antenna, a complex value for each combination of Doppler bin and range bin (i.e. for each Doppler/range bin). This can be seen to give an antenna-specific R/D map.

In 406, to generate an aggregate R/D map, the radar processing chain 402 combines the MMIC-specific R/D maps, e.g. by summing them up, for example by coherent or non-coherent integration. In 407, it then estimates the velocity and range of specific objects by identifying peaks in the aggregate R/D map, e.g. by means of a CFAR (Constant False Alarm Rate) algorithm. It should be noted that since an FFT output consists in general of complex values, a peak selection in an FFT output (such as the aggregate R/D map) may be understood as a selection based on absolute values (i.e. complex magnitudes of the complex outputs) or power (i.e. squares of absolute values).

In 408, the radar signal processor 307 may further determine the direction of the one or more objects. This can be done based on the phase differences of the output values of the second stage FFT between different receive antennas and may include a third stage FFT (angular FFT).

Based on the results of this processing, further processing such as object classification, tracking, generation of an object list, e.g. including sensor fusion at some point, and decision-making (e.g. motion planning in autonomous driving) may be performed in 409, 410 and 411. This may at least partially be carried out by a further component such as a vehicle controller. For this, the radar signal processor 307 may output processing results via an output interface 309.

The digitized receive signals provided by the MMIC 401 are typically arranged in a data cube.

Figure 5:
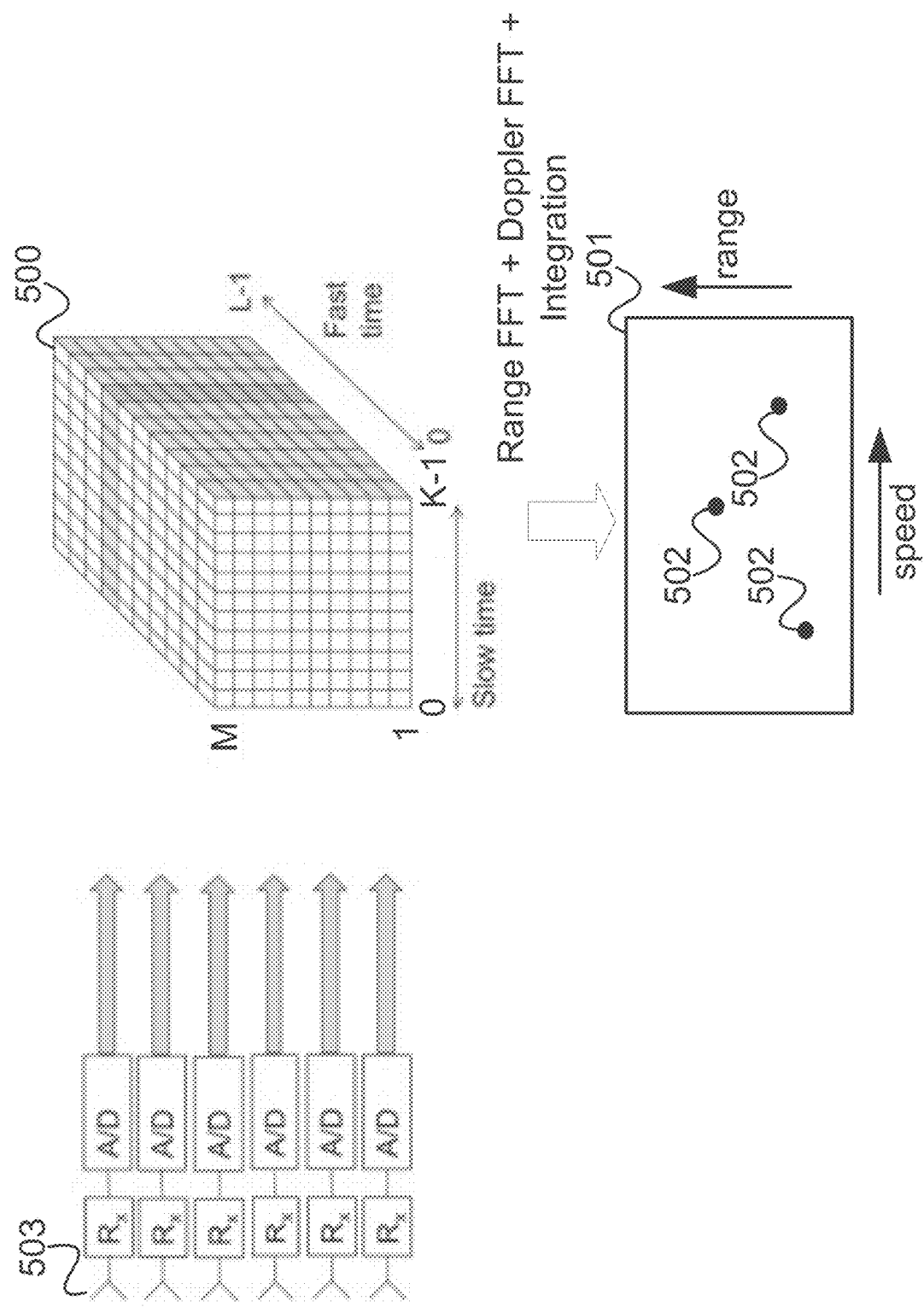
FIG. 5 shows a data cube.

FIG. 5 shows a data cube 500.

The data cube 500 includes digitized samples of receive signals from M antennas forming a receive antenna array 503. The MMIC 401 performs analog/digital conversion to generate the digitized samples.

For example, for each chirp, the received signal is sampled to have L samples (e.g. L=512).

The L samples collected for each chirp are processed by the first FFT 404.

The first FFT 404 is performed for each chirp and each antenna, so that the result of the processing of the data cube 500 by the first FFT 404 has again three dimensions and may have the size of the data cube 500 but does no longer have values for L sampling times but instead values for L/2 range bins (because usually the second half of the range bins is omitted because it is a repetition of the first half due to the FFT being applied to real input values).

The result of the processing of the data cube 500 by the first FFT 404 is then processed by the second FFT 405 along the chirps (for each antenna and for each range bin).

The direction of the first FFT 404 is referred to as fast time whereas the direction of the second FFT 405 is referred as slow time.

The result of the second FFT 405 gives, when aggregated over the antennas (in 406), a range-Doppler (R/D) map 501 which has FFT peaks 502 (i.e. peaks of FFT output values (in terms of absolute values) for certain range-Doppler combinations (i.e. for certain range-Doppler bins) which the radar signal processor 307 expects to correspond to detected objects 108 (of a certain range and speed).

As explained above, in 408, DoA (direction of arrival) determination is carried out using the results of the peak detection, wherein, for each detected peak, the results of the Doppler FFT 405 for that peak (i.e. for the range-Doppler bin) are taken from the R/D map of each antenna. This means that the input to the DoA 408 is, for each peak (i.e. each estimated object), a vector including, for each antenna, the entry that the R/D map for that antenna has for the range-Doppler bin where that peak is located in the aggregate R/D map. It should further be noted that while the description above referred to antennas, these may also be channels, in particular in case of a MIMO (multiple-input, multiple-output) radar system, wherein each channel is formed by a pairs of one of multiple transmit antennas and one of multiple receive antennas.

The radar system 101 has a certain angular resolution in the DoA determination. The angular resolution can be improved by increasing the aperture of the radar system. This can be done either physically (at the cost of chip area) or virtually by calculation (at the cost of processing power). Since processing power is typically available, approaches using algorithms to increase resolution are often used. Typically, however, those approaches suffer from signal correlation.

As explained above, the input for the DoA determination 408 is, for each peak (i.e. each detected object), a vector x including, for each channel, the entry that the R/D map for that antenna has for the range-Doppler bin where that peak is located in the aggregate R/D map. Now, according to various embodiments, these entries may include entries calculated for additional (i.e. artificial) channels (which do not actually exist, i.e. over which the radar system does not actually transmit signals). These additional entries are calculated from the "real" entries i.e. from the R/D map entries calculated for channels each corresponding to an existing pair of transmit and receive antenna. In other words, a vector of "real" entries is extended to a vector which includes entries for additional (not physically existing) channels.

It is now assumed that the DoA determination 408 operates on the autocorrelation matrix R of this vector x. This matrix is also referred to as the spatial covariance matrix for the (Doppler Fourier transform result) vector x (for the respective peak). Examples are the MUSIC (MUltiple SIgnal Classification) algorithm, the RootMUSIC algorithm and the ESPRIT (Estimation of Signal Parameters via Rational Invariance Techniques) algorithm.

The autocorrelation matrix is also referred to as spatial covariance matrix. It can be calculated (e.g. as a pre-processing of the DoA determination before applying MUSIC) by $$R = xx^H \qquad (1)$$

It should be noted that here, it is assumed that entries from a single frame are taken. When there are more frames or snapshots (number N), R can be calculated as $$R = \sum_{t=1}^{N} x(t)x(t)^H \qquad (2)$$

where the x(t) are Doppler FFT result vectors (containing range-Doppler-map data) like the vector x above, but for each frame (or snapshot) index t.

As stated above, the vector x may include entries for additional (not physically existing) channels which leads to correlation between the range-Doppler-map data for the DoA. Even if the vector x does onyls include entries for physically existing channels, there may be correlation, since in an active radar system the echoes 110 received by different receive antennas are correlated since they are reflections of the same transmit signal.

In any case, the correlation leads to linear dependence of vectors (rows and columns) of the spatial covariance matrix, resulting in a spatial covariance matrix having a lower rank than the number of targets (i.e. peaks). This, however, leads to a DoA algorithm based on the spatial covariance matrix like MUSIC to perform poorly because it cannot resolve the targets.

One approach to address this issue is a multi-frequency approach, where chirps are sent which have different center frequencies. The center frequency of a chirp is the center frequency of the frequency interval which the chirp covers (i.e. the center frequency of the interval from the minimum frequency and the maximum frequency of the chirp). However, this requires additional bandwidth.

According to various embodiments, an approach is provided which allows generating a spatial covariance matrix with increased rank without the need for additional bandwidth. This is achieved by using a machine learning model, specifically a (deep) neural network, which is trained to create, from a spatial covariance matrix (i.e. the original spatial covariance matrix calculated for vector x), another spatial covariance matrix which appears to come from a different transmission (center) frequency.

Thus, in addition to the original spatial covariance matrix, one or more additional spatial covariance matrices (for different center frequencies) may be generated which have different correlation properties from one another and the original spatial covariance matrix. All the spatial covariance matrices (including the original spatial covariance matrix as well as the ones generated by the neural network) may therefore be combined to a (combined) spatial covariance matrix having increased rank. The combination may be an averaging of the spatial covariance matrices. A number of spatial covariance matrices may be generated by the neural network such that the rank of the combined spatial covariance matrix is at least as high as the number of peaks. With this combined spatial covariance matrix as input, a DoA algorithm like MUSIC can resolve the targets. Thus, aperture can be increased without the need for higher bandwidth, multiple frames, transmission of chirps with different center frequencies or restriction of array design or loss of virtual elements to include redundant antenna elements.

Figure 6:
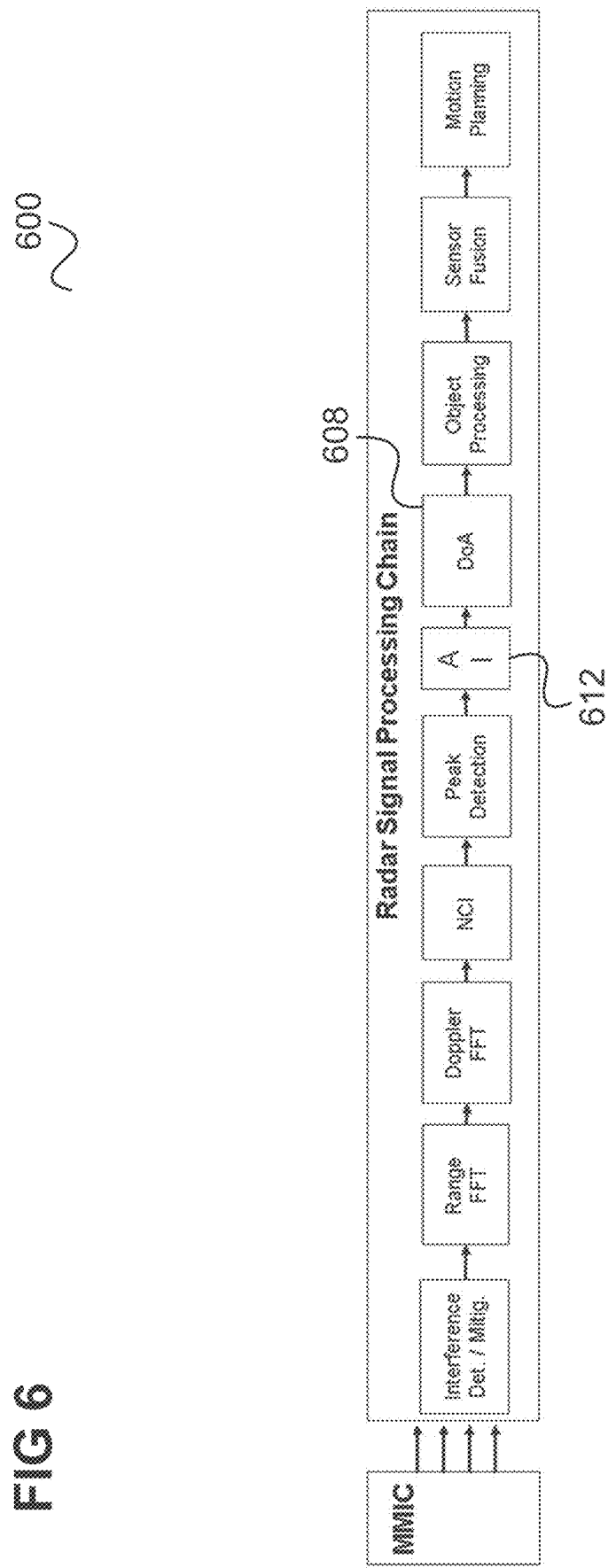
FIG. 6 shows a radar processing chain according to an embodiment.

FIG. 6 shows a radar processing chain 600 according to an embodiment.

The radar processing chain 600 differs from the radar processing chain of FIG. 4 in that there is an AI-based DoA pre-processing block 612 in front of the DoA determination 608.

The AI-based DoA pre-processing block 612 receives, for each peak in the aggregate range-Doppler map, an entry (i.e. a Doppler FFT coefficient) for each channel equal to the entry of the range-Doppler bin where the peak is located in the range-Doppler map of that channel. Optionally, tt then extends these entries to, for each peak, a vector x which has a Doppler FFT coefficients for each of the channels and each of one or more additional channels.

Figure 7:
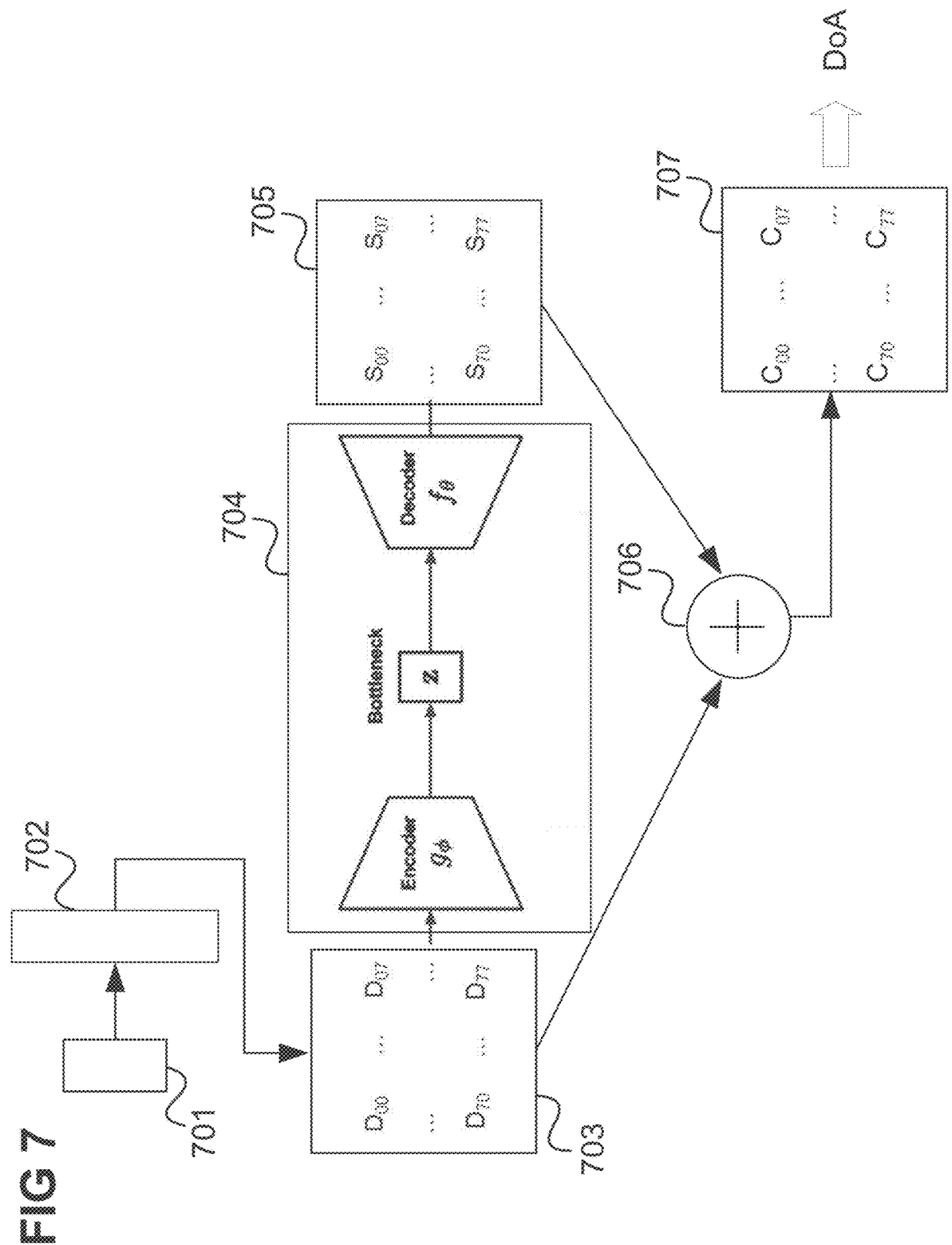
FIG. 7 illustrates the processing of a DoA pre-processing block for one peak.

FIG. 7 illustrates the processing of the DoA pre-processing block 612 for one peak.

As described above, the AI-based processing block receives a vector of entries 701 including a Doppler FFT coefficient for each channel for the peak. The DoA pre-processing block may optionally extend this vector 701 to a vector x 702 by supplementing it with entries for additional channels as described above. Alternatively, the vector x 702 may be the same as the received vector 701 (i.e. the vector is not extended). From the vector x, the DoA pre-processing block generates a spatial correlation matrix 703 according to equation (1) (or equation (2) if vectors 701 of multiple frames are used).

Since the vector 701 and, by extension, the vector x 702 has been generated from radio signals received in response to the transmission of chirps with a certain center frequency, the spatial covariance matrix 703 corresponds to that center frequency (i.e. is a spatial covariance matrix for that (chirp) center frequency)

This spatial covariance matrix 703 is also referred to as the original spatial covariance matrix. It is fed to a neural network 704 which generates a spatial covariance matrix 705 for another center frequency. The generated spatial covariance matrix 705 is combined (by a combiner 706) with the original spatial covariance matrix 703 (and/or with one or more additional spatial covariance matrices generated similarly) resulting in a combined spatial covariance matrix 707 with increased rank which is then be fed to the DoA determination.

It should be noted that multiple spatial covariance matrices 705 for a set of center frequencies may be generated and combined with the original spatial covariance matrix to form the combined spatial covariance matrix 707. It can be expected that each spatial covariance matrix 705 generated and combined with the original spatial covariance matrix 703 increases the rank by 1. So, according to various embodiments, a number of spatial covariance matrices 705 is generated and combined with the original spatial covariance matrix 703 equal to the number of peaks minus 1 (so that the rank of the combined spatial covariance matrix 707 can be expected to be equal to the number of targets).

It should be noted that the input matrix 703 and the output matrix 705 may have two layers, one for the real components of the covariance values and one for the corresponding imaginary components of the covariance values such that the neural network 704 may operate on real values. This means that for the input to the neural network 704, a complex-valued covariance matrix (2D) is mapped into a real-valued tensor (3D) such that the relationship between real and imaginary part in the third dimension is kept and the neural network generates a real-valued output tensor which is mapped back to a complex-valued covariance matrix.

The neural network 704 may include convolutional layers (including max-pooling) as well as (e.g. followed by) fully connected layers. In the illustration of FIG. 7, the neural network 704 has an autoencoder structure but this is not necessary. It may for example have a Unet structure or be a recurrent neural network.

In case that spatial covariance matrices 705 for multiple center frequencies should be generated, the DoA pre-processing 712 may implement a respective neural network 704 for each center frequency (i.e. trained to generate a spatial covariance matrix for a respective frequency). There may also be a neural network which generates spatial covariance matrices 705 for multiple center frequencies (i.e. which includes the functionality of multiple versions of the neural network 704). In the later case, the combiner may also be implemented by this neural network (or may be seen as a part of this neural network) which for example contains the neural network 704 (or multiple versions of the neural network 704) as sub-networks. A further alternative is that the DoA pre-processing 712 implements a neural network which receives a desired center frequency as input parameter or the neural network 704 is trained to perform a shift of the center frequency such that spatial covariance matrices for different frequencies may be generated by multiple subsequent applications of the neural network 704.

In each case, the neural network 704 may be generated by supervised training with training data including training data elements, wherein each training data element includes an input matrix for the neural network and a (target or ground truth) output matrix that the neural network is supposed to generate for the input matrix.

Training data for the neural network may be acquired via simulation (every corner case and every possible combination can be generated) or via real measurements or combination of both. A first option is to simulate ADC data (i.e. digitized radar signal samples) for a certain scene (i.e. with one or more target objects) and process the simulated ADC data to generate a corresponding DoA determination input vector (i.e. vector 701), extend that vector, and calculate the spatial covariance matrix for that (extended) vector. Doing this for different chirp center frequencies gives spatial covariance matrices for different chirp center frequencies and by choosing pairs of those, training data elements for the neural network 704 may be obtained including one spatial covariance matrix as input and one as target output.

Rather than simulating ADC data, a second option is to simulate the DoA determination input vector directly for a scene.

For example, training data is generated by simulation runs with following parameters drawn from a random, uniform distribution:

Number of targets $x0=[1 \ldots n]$
Angles of targets $x1=[-90°, 90°]$
RCS (radar cross section) of the targets $x2=[-5$ dbsm, 20 dbsm]
Channel phase error $x3=[-10°, 10°]$
(Chirp) Center Frequency x4=[76 GHZ, 81 GHz] (one for input, different one for ground truth)

It should be noted that training may be performed by an external device. For example, the machine learning model may be trained by a computer and later be stored in a device implementing the AI processing. Nevertheless, the training device may be regarded as part of the radar system, even if it is external.

Figure 8:
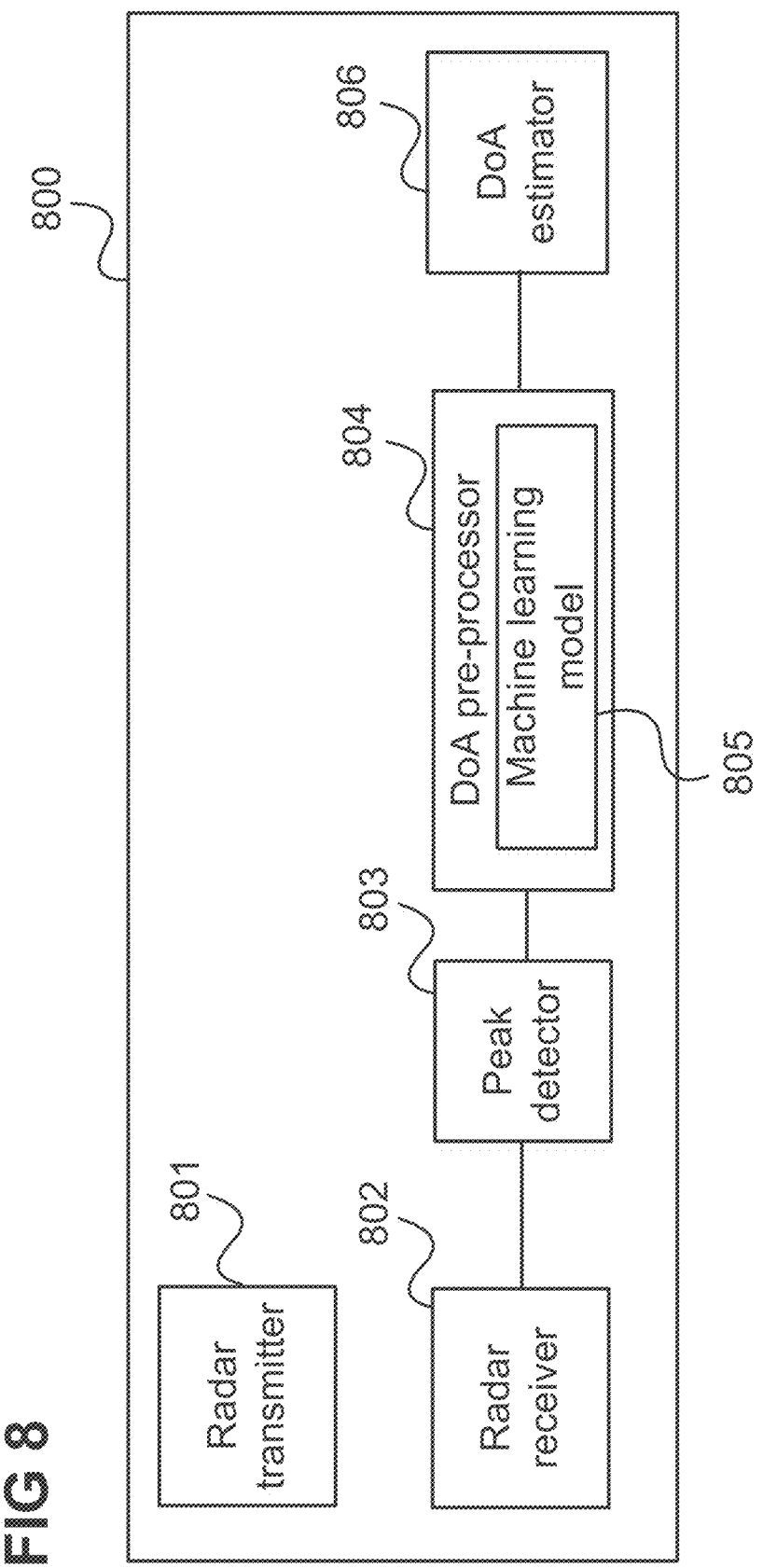
FIG. 8 shows a radar system according to an embodiment.

In summary, according to various embodiments, a radar system is provided as illustrated in FIG. 8.

FIG. 8 shows a radar system 800 according to an embodiment.

The radar system 800 includes a radar transmitter 801 configured to transmit radio signal chirps with a predetermined center frequency via at least one transmit antenna and a radar receiver 802 configured to receive radio signals including echoes of the transmitted radio signal chirps.

Further, the radar system 800 includes a peak detector 803 configured to perform peak detection using the received radio signals, wherein each detected peak corresponds to a detected object.

The radar system 800 further includes a direction of arrival pre-processor 804 configured to for a detected peak (e.g. for each detected peak or at least some of the detected peaks), obtain a Doppler Fourier transform result vector having, for each channel of a plurality of channels, an entry specifying a Doppler Fourier transform result for the channel (calculated from radio signals received by the receive antenna including echoes of chirps transmitted from the transmit antenna of the pair to which the channel corresponds);

generate a spatial covariance matrix for the Doppler Fourier transform result vector; and generate, for each center frequency of a set of at least one other center frequencies, an additional spatial covariance matrix by inputting the spatial covariance matrix to a machine learning model 805 trained to predict, from an input spatial covariance matrix an output spatial covariance matrix such that the output spatial covariance matrix corresponds to a different chirp center frequency than the input covariance spatial covariance matrix.

Additionally, the radar system 800 includes a direction of arrival estimator 806, wherein the direction of arrival pre-processor 804 is configured to generate a direction of arrival estimation input using the at least one additional spatial covariance matrix and the direction of arrival estimator 806 is configured to perform direction-of-arrival estimation using the direction of arrival estimation input.

According to various examples, in other words, one or more spatial correlation matrices for other chirp center frequencies than the one actually used are generated and used for DoA determination (i.e. estimation). This allows addressing the issue of correlation of signals between different channels, for example of channels for which Doppler FFT results were artificially generated (i.e. for which signals were not actually received).

The differences between the chirp center frequencies may be in the range of 100 MHz until several GHz. They may for example be in the range between 76 and 81 GHz but may also be outside that range.

According to various examples a method as illustrated in FIG. 9 is performed.

FIG. 9 shows a flow diagram 900 illustrating a method for performing direction of arrival estimation in a radar system.

In 901, radio signal chirps are transmitted with a predetermined center frequency via at least one transmit antenna.

In 902, radio signals including echoes of the transmitted radio signal chirps are received.

In 903, peak detection is performed using the received radio signals, wherein each detected peak corresponds to a detected object;

In 904, for a detected peak, a Doppler Fourier transform result vector is obtained having, for each channel of a plurality of channels, an entry specifying a Doppler Fourier transform result for the channel.

In 905, a spatial covariance matrix is generated for the Doppler Fourier transform result vector.

In 906, for each center frequency of a set of at least one other center frequencies, an additional spatial covariance matrix is generated by inputting the spatial covariance matrix to a machine learning model trained to predict, from an input spatial covariance matrix an output spatial covariance matrix such that the output spatial covariance matrix corresponds to a different chirp center frequency than the input covariance spatial covariance matrix.

In 907, a direction of arrival estimation input is generated using the at least one additional spatial covariance matrix.

In 908, direction-of-arrival estimation is performed using the direction of arrival estimation input.

The method may be performed and the components of the radar system may be implemented by one or more processors. A "processor" may be understood as any kind of a logic implementing entity, which may be special purpose circuitry or a processor executing software stored in a memory, firmware, or any combination thereof. Thus a "processor" may be a hard-wired logic processor or a programmable logic processor such as a programmable processor, e.g. a microprocessor. A "processor" may also be a processor executing software, e.g. any kind of computer program. Any other kind of implementation of the respective functions which are described herein in more detail may also be understood as a "processor". The radar transmitter, radar receiver, the peak detector, the direction of arrival pre-processor and the direction of arrival estimator may each be implemented by one or more circuits. For example, the peak detector, the direction of arrival pre-processor and the direction of arrival estimator may be implemented by the radar signal processing circuit 111. They may be part of radar signal processing chain, e.g. implemented by one or more microcontrollers.

The following examples pertain to further exemplary implementations.

Example 1 is a radar system as illustrated in FIG. 8.

Example 2 is the radar system of Example 1, wherein the set of other center frequencies includes multiple center frequencies different from each other and different from the predetermined center frequency.

Example 3 is the radar system of Example 1 or 2, wherein the direction of arrival pre-processor is configured to, for each center frequency, generate the additional spatial covariance matrix using a neural network trained for that center frequency.

Example 4 is the radar system of Example 1 or 2, wherein the neural network is trained to predict the output spatial covariance matrix to correspond to a chirp center frequency which is shifted with respect to the chirp center frequency to which the input spatial covariance matrix corresponds and wherein the direction of arrival pre-processor is configured to, for each center frequency, generate the additional spatial covariance matrix by application of the neural network one or more times sequentially to the spatial covariance matrix to generate the additional spatial covariance matrix corresponding to the center frequency.

Example 5 is the radar system of any one of Examples 1 to 4, wherein the direction of arrival pre-processor is configured to generate the direction of arrival estimation input by combining spatial covariance matrices of a set of spatial covariance matrices including the spatial covariance matrix and the at least one additional spatial covariance matrix, wherein the direction of arrival estimation input is a combined spatial correlation matrix resulting from the combining.

Example 6 is the radar system of any one of Examples 1 to 5, including a radar processor configured to generate, for each of at least some of the channels, a range-Doppler map from radio signals associated with the channel and wherein the entry of the Doppler Fourier transform result vector for the detected peak is a Doppler Fourier transform result value that the range-Doppler map generated for the channel contains for a range bin and a velocity bin of the detected peak Example 7 is the radar system of Example 6, wherein the peak detector is configured to perform the peak detection by integrating the range-Doppler maps generated to an aggregate range-Doppler map and identify peaks in the aggregate range-Doppler map.

Example 8 is the radar system of Example 6 or 7, wherein the direction of arrival pre-processor is configured to generate the direction of arrival estimation input by combining at least as many spatial covariance matrices as the peak detector has detected peaks in the range-Doppler map of a set of spatial covariance matrices including the spatial covariance matrix and the at least one additional spatial covariance matrix.

Example 9 is the radar system of any one of Examples 1 to 8, wherein each radio signal is associated with a channel of the plurality of channels which corresponds to a pair of transmit antenna and receive antenna of the radar system and the direction of arrival pre-processor is configured to obtain, for the detected peak, an initial Doppler Fourier transform result vector having, for each of the channels with which a radio signal is associated, an entry specifying a Doppler Fourier transform result for the channel and extend the initial Doppler Fourier transform result vector to the Doppler Fourier transform vector by extending the initial Doppler Fourier transform result vector by entries specifying Doppler Fourier transform results for one or more additional channels.

Example 10 is the radar system of Example 9, wherein, for each of the one or more additional channels, the Doppler Fourier transform result is a Doppler Fourier transform result value for a range bin and a velocity bin of the detected peak for the one or more additional channel.

Example 11 is the radar system of Example 9 or 10, wherein the one or more additional channels are channels other than the channels formed by a transmit antenna and a receive antenna of the radar system.

Example 12 is the radar system of any one of Examples 1 to 11, including a training device configured to train the machine learning model.

Example 13 is the radar system of Example 11, wherein the training device is configured to train the machine learning model by supervised learning wherein the training device is configured to generate each of a multiplicity of ground truth spatial covariance matrices for each center frequency of the set of center frequencies by simulation of received radio signals and processing them to a Doppler Fourier transform result vector or simulating a Doppler Fourier transform result vector and calculating a spatial covariance matrix of the Doppler Fourier transform result vector.

Example 14 is the radar system of any one of Examples 1 to 13, wherein the machine learning model is a neural network.

Example 15 is the radar system of Example 14, wherein the neural network includes one or more convolutional layers.

Example 16 is the radar system of Example 14 or 15, wherein the neural network has an autoencoder structure or a recurrent neural network.

Example 17 is a method for performing direction of arrival estimation in a radar system as illustrated in FIG. 9.

Example 18 is the method of Example 17, further including training the machine learning model.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

REFERENCE SIGNS

100 radar arrangement
101 radar device
102 antenna arrangement 103 radar control device
104 transmitter
105 duplexer
106 receiver
107 controller
108 object
109 transmit signal
110 echo
111 radar signal processing circuit
200 FMCW radar system
201 saw tooth waveform
202 oscillator
203 transmit antenna
204 receive antenna
205 mixer
206 low pass filter
207 spectrum analyzer
208 chirp
300 radar device
301 oscillator with ramper
302 transmit amplifiers
303 mixers
304 analog filters
305 ADCs
306 digital interface
307 radar signal processor
308 radar signal processing circuit
309 output interface
310 MMIC
311 power amplifier
312 transmit signal interface
401 MMIC
402 Radar signal processing chain
403-411 Radar processing
500 data cube
501 aggregate range/Doppler map
502 FFT peaks
503 receive antennas
600 radar processing chain
608 DoA determination
612 AI-based pre-processing block
701 Doppler Fourier transform result vector
702 extended Doppler Fourier transform result vector
703 spatial correlation matrix
704 machine-learning model
705 additional spatial correlation matrix
706 combiner
707 combined spatial correlation matrix
800 radar system
801 radar transmitter
802 radar receiver
803 peak detector
804 DoA pre-processor
805 machine-learning model
806 DoA estimator
9000 flow diagram
901-909 processing

What is claimed is:

1. A radar system, comprising:
a radar transmitter configured to transmit radio signal chirps with a predetermined center frequency via at least one transmit antenna;
a radar receiver configured to receive radio signals comprising echoes of the transmitted radio signal chirps;
a peak detector configured to perform peak detection using the received radio signals, wherein each detected peak corresponds to a detected object;
a direction of arrival pre-processor configured to
for a detected peak, obtain a Doppler Fourier transform result vector having, for each channel of a plurality of channels, an entry specifying a Doppler Fourier transform result for the channel;
generate a spatial covariance matrix for the Doppler Fourier transform result vector; and
generate, for each center frequency of a set of at least one other center frequencies, an additional spatial covariance matrix by inputting the spatial covariance matrix to a machine learning model trained to predict, from an input spatial covariance matrix an output spatial covariance matrix such that the output spatial covariance matrix corresponds to a different chirp center frequency than the input covariance spatial covariance matrix; and
a direction of arrival estimator, wherein the direction of arrival pre-processor is configured to generate a direction of arrival estimation input using the at least one additional spatial covariance matrix and the direction of arrival estimator is configured to perform direction-of-arrival estimation using the direction of arrival estimation input.

2. The radar system of claim 1, wherein the set of other center frequencies comprises multiple center frequencies different from each other and different from the predetermined center frequency.

3. The radar system of claim 1, wherein the direction of arrival pre-processor is configured to, for each center frequency, generate the additional spatial covariance matrix using a neural network trained for that center frequency.

4. The radar system of claim 1, wherein the neural network is trained to predict the output spatial covariance matrix to correspond to a chirp center frequency which is shifted with respect to the chirp center frequency to which the input spatial covariance matrix corresponds and wherein the direction of arrival pre-processor is configured to, for each center frequency, generate the additional spatial covariance matrix by application of the neural network one or more times sequentially to the spatial covariance matrix to generate the additional spatial covariance matrix corresponding to the center frequency.

5. The radar system of claim 1, wherein the direction of arrival pre-processor is configured to generate the direction of arrival estimation input by combining spatial covariance matrices of a set of spatial covariance matrices comprising the spatial covariance matrix and the at least one additional spatial covariance matrix, wherein the direction of arrival estimation input is a combined spatial correlation matrix resulting from the combining.

6. The radar system of claim 1, comprising a radar processor configured to generate, for each of at least some of the channels, a range-Doppler map from radio signals associated with the channel and wherein the entry of the Doppler Fourier transform result vector for the detected peak is a Doppler Fourier transform result value that the range-Doppler map generated for the channel contains for a range bin and a velocity bin of the detected peak.

7. The radar system of claim 6, wherein the peak detector is configured to perform the peak detection by integrating the range-Doppler maps generated to an aggregate range-Doppler map and identify peaks in the aggregate range-Doppler map.

8. The radar system of claim 6, wherein the direction of arrival pre-processor is configured to generate the direction of arrival estimation input by combining at least as many spatial covariance matrices as the peak detector has detected peaks in the range-Doppler map of a set of spatial covariance matrices comprising the spatial covariance matrix and the at least one additional spatial covariance matrix.

9. The radar system of claim 1, wherein each radio signal is associated with a channel of the plurality of channels which corresponds to a pair of transmit antenna and receive antenna of the radar system and the direction of arrival pre-processor is configured to obtain, for the detected peak, an initial Doppler Fourier transform result vector having, for each of the channels with which a radio signal is associated, an entry specifying a Doppler Fourier transform result for the channel and extend the initial Doppler Fourier transform result vector to the Doppler Fourier transform vector by extending the initial Doppler Fourier transform result vector by entries specifying Doppler Fourier transform results for one or more additional channels.

10. The radar system of claim 9, wherein, for each of the one or more additional channels, the Doppler Fourier transform result is a Doppler Fourier transform result value for a range bin and a velocity bin of the detected peak for the one or more additional channel.

11. The radar system of claim 9, wherein the one or more additional channels are channels other than the channels formed by a transmit antenna and a receive antenna of the radar system.

12. The radar system of claim 1, comprising a training device configured to train the machine learning model.

13. The radar system of claim 11, wherein the training device is configured to train the machine learning model by supervised learning wherein the training device is configured to generate each of a multiplicity of ground truth spatial covariance matrices for each center frequency of the set of center frequencies by simulation of received radio signals and processing them to a Doppler Fourier transform result vector or simulating a Doppler Fourier transform result vector and calculating a spatial covariance matrix of the Doppler Fourier transform result vector.

14. The radar system of claim 1, wherein the machine learning model is a neural network.

15. The radar system of claim 14, wherein the neural network comprises one or more convolutional layers.

16. The radar system of claim 14, wherein the neural network has an autoencoder structure or a recurrent neural network.

17. A method for performing direction of arrival estimation in a radar system, the method comprising:

transmitting radio signal chirps with a predetermined center frequency via at least one transmit antenna;

receiving radio signals comprising echoes of the transmitted radio signal chirps;

performing peak detection using the received radio signals, wherein each detected peak corresponds to a detected object;

for a detected peak, obtaining a Doppler Fourier transform result vector having, for each channel of a plurality of channels, an entry specifying a Doppler Fourier transform result for the channel;

generating a spatial covariance matrix for the Doppler Fourier transform result vector;

generating, for each center frequency of a set of at least one other center frequencies, an additional spatial covariance matrix by inputting the spatial covariance matrix to a machine learning model trained to predict, from an input spatial covariance matrix an output spatial covariance matrix such that the output spatial covariance matrix corresponds to a different chirp center frequency than the input covariance spatial covariance matrix;

generating a direction of arrival estimation input using the at least one additional spatial covariance matrix; and performing direction-of-arrival estimation using the direction of arrival estimation input.

18. The method of claim 17, further comprising training the machine learning model.

\* \* \* \* \*